United States Patent
Zagorski

(10) Patent No.: US 9,233,692 B2
(45) Date of Patent: Jan. 12, 2016

(54) METHOD TO CONTROL A VEHICLE PATH DURING AUTONOMOUS BRAKING

(71) Applicant: GM GLOBAL TECHNOLOGY OPERATIONS LLC, Detroit, MI (US)

(72) Inventor: Chad T. Zagorski, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 18 days.

(21) Appl. No.: 14/202,497

(22) Filed: Mar. 10, 2014

(65) Prior Publication Data
US 2015/0251664 A1    Sep. 10, 2015

(51) Int. Cl.
| | |
|---|---|
| G05D 3/00 | (2006.01) |
| B60W 40/114 | (2012.01) |
| B60W 40/068 | (2012.01) |
| B62D 6/04 | (2006.01) |
| B60T 7/12 | (2006.01) |

(52) U.S. Cl.
CPC ............... B60W 40/114 (2013.01); B60T 7/12 (2013.01); B60W 40/068 (2013.01); B62D 6/04 (2013.01)

(58) Field of Classification Search
CPC .... B60W 40/114; B60W 40/068; B62D 6/04; B60T 7/12
See application file for complete search history.

(56) References Cited

U.S. PATENT DOCUMENTS

| | | | | |
|---|---|---|---|---|
| 2010/0077847 | A1* | 4/2010 | Joe et al. | 73/146 |
| 2010/0161194 | A1* | 6/2010 | Turski et al. | 701/87 |
| 2012/0022747 | A1* | 1/2012 | Zagorski et al. | 701/48 |
| 2013/0253793 | A1* | 9/2013 | Lee et al. | 701/70 |

* cited by examiner

*Primary Examiner* — Mary Cheung
(74) *Attorney, Agent, or Firm* — Ingrassia Fisher & Lorenz, P.C.

(57) ABSTRACT

Methods, systems are provided for controlling a travel path of a vehicle. The method includes the steps of detecting a braking of the vehicle by a computing device, calculating a friction ellipse for the vehicle based on the current state of the vehicle, defecting an intended travel path of the vehicle, detecting an actual travel path of the motor vehicle during the braking and determining if there is a path error where the actual travel path is outside the intended travel path when the braking is detected. When the actual travel path is outside the intended travel path then the method calculates a prospective friction ellipse for the vehicle, determines a compensating yaw moment to correct the path error, determines a maximum acceleration based on the prospective friction ellipse, and transmits a command to the autonomous braking system based on the maximum acceleration and the compensating yaw moment.

20 Claims, 3 Drawing Sheets

| Fxmax | Fymax | New Fxmax | New Fymax | | | | | | |
|---|---|---|---|---|---|---|---|---|---|
| 10 | 8 | 7 | 5.6 | | | | | | |
| 301 | 302 | 303 | 304 | 305 | 306 | 307 | 308 | 309 | 310 |
| 6.84 | 4.50 | 30.00 | 200 | 200 | 0 | | 1.368 | 1.368 | 0.000 |
| 7.62 | 3.91 | 29.32 | 200 | 220 | 0 | | 1.337 | 1.215 | 0.122 |
| 4.19 | 3.55 | 28.55 | 200 | 230 | 1 | | 1.302 | 1.132 | 0.291 |
| 4.11 | 3.60 | 28.14 | 200 | 220 | 1 | 0.122 | 1.283 | 1.166 | 0.286 |
| 4.01 | 3.66 | 27.72 | 200 | 210 | 1 | 0.170 | 1.264 | 1.204 | 0.177 |
| 3.16 | 4.15 | 27.32 | 200 | 180 | 1 | 0.117 | 1.246 | 1.384 | -0.078 |
| 3.33 | 4.05 | 27.01 | 200 | 180 | 1 | 0.060 | 1.231 | 1.368 | -0.275 |
| 3.87 | 3.74 | 26.67 | 200 | 190 | 1 | -0.138 | 1.216 | 1.280 | -0.201 |
| 4.34 | 3.46 | 26.29 | 200 | 200 | 1 | -0.137 | 1.199 | 1.199 | -0.064 |
| 4.51 | 3.34 | 25.85 | 200 | 200 | 1 | -0.064 | 1.179 | 1.179 | 0.000 |
| 4.68 | 3.23 | 25.40 | 200 | 200 | 1 | 0.000 | 1.158 | 1.158 | 0.000 |
| 4.84 | 3.11 | 24.94 | 200 | 200 | 1 | 0.000 | 1.137 | 1.137 | 0.000 |
| 5.01 | 2.99 | 24.45 | 200 | 200 | 1 | 0.000 | 1.115 | 1.115 | 0.000 |

METHOD TO CONTROL A VEHICLE PATH DURING AUTONOMOUS BRAKING

TECHNICAL FIELD

The present invention generally relates to automated vehicle control systems. More particularly the present invention relates to steering and braking control systems that maintain an intended path of a vehicle during autonomous braking of the vehicle, including sliding and skidding situations.

BACKGROUND

There is a need for methods to determine an intended path of travel for a vehicle and to automatically provide steering and braking control to maintain a vehicle on the intended path during braking maneuvers by coupling the road path and the driver's intended path with the need for autonomous braking. The results of the methods herein disclosed maximize velocity reduction during the braking maneuver while maintaining the vehicle on the desired path.

Electronic Stability Control (ESC) is the generic term for systems designed to improve a motor vehicle's handling, particularly at the limits where the driver might lose control of the motor vehicle. See, for example, the Society of Automotive Engineers (SAE) document on "Automotive Stability Enhancement Systems", publication J2564 (December 2000, June 2004). ESC compares the driver's intended direction in steering and braking inputs to the motor vehicle's response, via lateral acceleration, rotation (yaw) and individual wheel speeds, and then brakes individual front or rear wheels and/or reduces excess engine power as needed to help correct understeer or oversteer. ESC also integrates all-speed traction control which senses drive-wheel slip under acceleration and individually brakes the slipping wheel or wheels, and/or reduces excess engine power until control is regained from a sliding situation. ESC cannot override a car's physical limits. It is a tool to help the driver maintain control. ESC combines anti-lock brakes, traction control and yaw control (yaw is spin around the vertical axis).

ESC systems use several sensors in order to determine the state the driver wants the motor vehicle to be in (i.e., a driver command). Other sensors indicate the actual state of the motor vehicle (i.e., motor vehicle response). The ESC control algorithm compares both states and decides, when necessary, to adjust the dynamic state of the motor vehicle. The sensors used for ESC have to send data at all times in order to detect possible defects as soon as possible. They have to be resistant to possible forms of interference (rain, potholes in the road, etc.). The most important sensors are: 1) steering wheel sensor, used to determine the steering angle the driver wants to take, often based on anisotropic magnetoresistive (AMR) elements; 2) lateral acceleration sensor, used to measure the lateral acceleration of the motor vehicle; 3) yaw sensor, used to measure the yaw angle (rotation) of the motor vehicle, can be compared by the ESC with the data from the steering wheel sensor in order to take a regulating action; and 4) wheel speed sensors used to measure the wheel speeds.

ESC uses, for example, a hydraulic modulator to assure that each wheel receives the correct brake force. A similar modulator is used with anti-lock brake systems (ABS). ABS needs to reduce pressure during braking, only. ESC additionally needs to increase brake pressure in certain situations.

The heart of the ESC system is the electronic control unit (ECU) or electronic control module (ECM), (i.e., motor vehicle controller or microprocessor). Diverse control techniques are embedded in the ECU and often, the same ECU is used for diverse systems at the same time (ABS, traction control, climate control, etc.). The desired motor vehicle state is determined based on the steering wheel angle, its rate of change and the wheel speed. Simultaneously, the yaw sensor measures the actual state. The controller computes the needed brake or acceleration force for each wheel and directs the actuation of, for example, the valves of a hydraulic brake modulator.

Motor vehicles utilizing electronic stability control systems require some means of determination of the driver's intended motor vehicle behavior (i.e., intended motor vehicle path or track). In General Motors' (GM's) StabiliTrak™ system these means are accomplished by the driver command interpreter, as described in U.S. Pat. No. 5,941,919 (issued Aug. 24, 1999), which is incorporated herein by reference in it's' entirety.

Referring now to FIG. 1, the exemplar prior art control structure described in U.S. Pat. No. 5,941,919 is shown. The controller 10 includes command interpreter 12 receiving the various system inputs from various vehicle sensors 14. The command interpreter 12 develops desired yaw rate commands responsive to the various system inputs and a data structure 16 stored in non-volatile memory of controller 10. The data structure 16 has a data subset 18 corresponding to vehicle operation in linear mode and a data subset 20 corresponding to vehicle operation in non-linear mode (e.g., skidding or sliding).

When the vehicle operation is in the linear mode, the command interpreter 12, using data structure subset 18, provides commands to a control block 22 designed to maintain the linear response of the vehicle. For example, when the control according to this system is used to control wheel brakes to affect vehicle yaw control, the commands provided by block 12 do not modify the wheel brake operation while the vehicle is in the linear mode. When the control is used to control a vehicle variable force suspension system, the suspension control is provided to maintain the current driving conditions, and not to induce a change in understeer or oversteer.

When the vehicle operation is in the non-linear region, the command interpreter 12, using data structure subset 20, provides commands to the control block 22 commanding a yaw rate linearly responsive to the vehicle steering wheel input. Block 22 uses the command generated at block 12 to control one or more vehicle chassis systems, such as controllable suspension actuators, represented by block 24 and/or brakes, represented by block 26 to bring the actual vehicle yaw into a linear relationship with vehicle steering wheel angle. This control thus maintains the yaw response of the vehicle linear with respect to the steering wheel input even when the vehicle is operating in its nonlinear performance region.

Also, collision preparation systems (CPS) are known in the art and are exemplified by U.S. Pat. No. 7,280,902 which discloses a motor vehicle deceleration control apparatus; U.S. Pat. No. 7,035,735 which discloses a method and device for automatically triggering a deceleration of a motor vehicle; and U.S. Patent Application Publication 2004/0254729 which discloses a pre-collision assessment of potential collision severity for motor vehicles.

U.S. Pat. No. 6,084,508, issued Jul. 4, 2000, the disclosure of which patent is hereby herein incorporated by reference. U.S. Pat. No. 6,084,508 discloses a collision preparation system which provides autonomous braking in certain situations. The method and arrangement for emergency braking of a vehicle, include a detection system on the vehicle which detects obstacles located in or near the direction of motion of the vehicle and generates corresponding data, sensors on the vehicle which generate data representing characteristic parameters of the condition of the vehicle, and an evaluating unit which determines, from the data on the obstacles and the parameters of the condition of the vehicle, target values for controlling the motion of the vehicle and, only upon determining that an impending collision of the vehicle with an obstacle is no longer avoidable by any action on the vehicle by steering or braking, triggers an autonomous emergency braking for rapid deceleration of the vehicle.

As described in U.S. Pat. No. 8,126,626, during an autonomous braking event as a result of actuation of a collision preparation system (CPS), the driver intended travel path and the actual motor vehicle travel paths are monitored. In the event that the vehicle departs from the driver intended motor vehicle travel path, the braking is lessened, so as to attempt to follow the motor vehicle travel path intended by the driver. However, the previous designs are strictly reactive. U.S. Pat. No. 8,126,626 was issued on Feb. 28, 2012 and is incorporated herein in its entirety.

Inputs from various sensors 14 and other data sources of the motor vehicle are provided to the stability controller 10. The stability controller 10 includes a command interpreter 12. The stability controller 10 utilizes the command interpreter 12 and the control commands block 22 to control operation of the braking system 26 in the manner described pursuant to U.S. Pat. Nos. 5,941,919 and 8,126,626.

The CPS braking adjustment controller 224 has provided to it, via a data line 226, the driver braking request, the yaw rate and/or other data providing actual motor vehicle travel path information, and the steering wheel position and/or other data providing the driver intended motor vehicle travel path information, are all available from the command interpreter 12 (although such an arrangement is exemplary and not intended to be limiting) and the CPS braking adjustment controller 224 further has available to it, via a data line 228, the activation status of the CPS 210 indicative of the autonomous braking status and the braking request of the CPS. The CPS braking adjustment controller 224 sends a braking reduction signal, via data line 230, to the braking system 26 in the event there is a detected difference (in practice, at least a predetermined small difference) between the driver intended motor vehicle travel path as compared to the actual motor vehicle travel path, wherein, preferably, the driver braking request does not exceed the CPS braking request.

However, this control action only seeks to correct the path by reducing the Collision Preparation System braking. The amount of velocity reduction by the braking system (the goal of the Collision Preparation System) is diminished with the expense of maintaining the intended path. Accordingly, what is needed in the art is a motor vehicle travel path control which monitors, during an autonomous braking event, the actual motor vehicle travel path in relation to the driver intended motor vehicle travel path and has the ability to minimize the difference between the two by generating a corrective yaw moment. Furthermore, other desirable features and characteristics of the present invention will become apparent from the subsequent detailed description and the appended claims, taken in conjunction with the accompanying drawings and the foregoing technical field and background.

SUMMARY

A travel path control method for a vehicle is provided. The method comprises the steps of detecting a braking of the vehicle by a processor and calculating a friction ellipse for the vehicle based on the current state of the vehicle. The method also includes detecting an intended travel path of the vehicle, detecting an actual travel path of the motor vehicle during the braking and determining if there is a path error where the actual travel path is outside the intended travel path when the braking is detected. When the actual travel path is outside the intended travel path, a prospective friction ellipse for the vehicle is calculated, a compensating yaw moment to correct the path error is determined and a maximum acceleration based on the prospective friction ellipse is determined. A command to the braking system and/or steering system based on the maximum available acceleration and the compensating yaw moment is then transmitted.

A travel path control system for a motor vehicle comprising two or more wheels is provided. The system comprises a braking system for a wheel and a collision preparation system interfaced with the braking system. The collision preparation system being configured to selectively implement autonomous braking of the motor vehicle during activation thereof responsive to predetermined conditions of travel of the motor vehicle. The motor vehicle further includes at least one source of data available to the collision preparation system braking adjustment controller. The at least one source of data available to the collision preparation system braking adjustment controller contains data comprising vehicle acceleration, actual vehicle travel path and driver intended vehicle travel path. In operation the collision preparation system braking adjustment controller compares the desired travel path to the actual travel path during the activation. When the actual travel path is outside desired travel path the collision preparation system adjustment controller is configured to calculate a prospective new friction ellipse of the vehicle, determine a compensating yaw moment to correct the error in path, determine the maximum longitudinal and lateral accelerations based on the prospective friction ellipse, and transmit a braking command to the braking system based on the maximum available acceleration and the compensating yaw moment.

A motor vehicle is provided for. The motor vehicle comprises at least two wheels and a braking system engagable with the wheels and a collision preparation system interfaced with the braking system. The collision preparation system selectively implements autonomous braking of the motor vehicle during activation thereof responsive to predetermined conditions of travel of the motor vehicle. The vehicle further includes at least one source of data available to the collision preparation system braking adjustment controller. The at least one source of data available to the collision preparation system braking adjustment controller comprises vehicle acceleration, actual vehicle travel path and driver intended vehicle travel path. In operation the collision preparation system braking adjustment controller compares the desired travel path to the actual travel path during the activation. When the actual travel path is outside the desired travel path the collision preparation system adjustment controller is configured to calculate a prospective new friction ellipse of the vehicle, determine a compensating yaw moment to correct the error in path, determine the maximum longitudinal and lateral accelerations based on the prospective friction ellipse, and transmit an braking command to the autonomous braking system based on the maximum acceleration and the compensating yaw moment.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
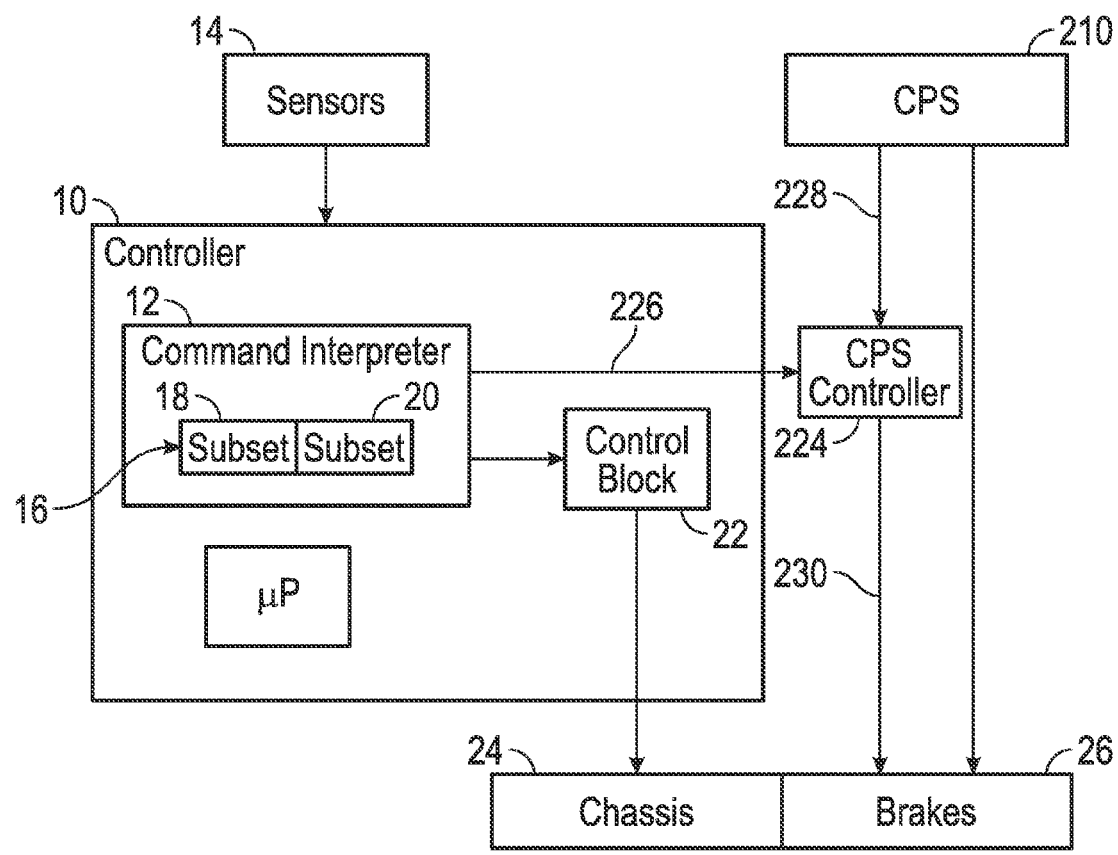
FIG. 1 is a functional block diagram of a prior art reactive travel path control system.

The following detailed description is merely exemplary in nature and is not intended to limit the application and uses. Furthermore, there is no intention to be bound by any expressed or implied theory presented in the preceding technical field, background, brief summary or the following detailed description.

Those of skill in the art will appreciate that the various illustrative logical blocks, modules, circuits, and algorithm steps described in connection with the embodiments disclosed herein may be implemented as electronic hardware, computer software executing on a processor, or combinations of both. Some of the embodiments and implementations are described above in terms of functional and/or logical block components (or modules) and various processing steps. However, it should be appreciated that such block components (or modules) may be realized by any number of hardware, software executing on a processor, and/or firmware components configured to perform the specified functions.

To clearly illustrate this interchangeability, various illustrative components, blocks, modules, circuits, and steps may be described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with an electronic control unit (ECU) in the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The word "exemplary" is used exclusively herein to mean "serving as an example, instance, or illustration." Any embodiment described herein as "exemplary" is not necessarily to be construed as preferred or advantageous over other embodiments.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

Figure 2:
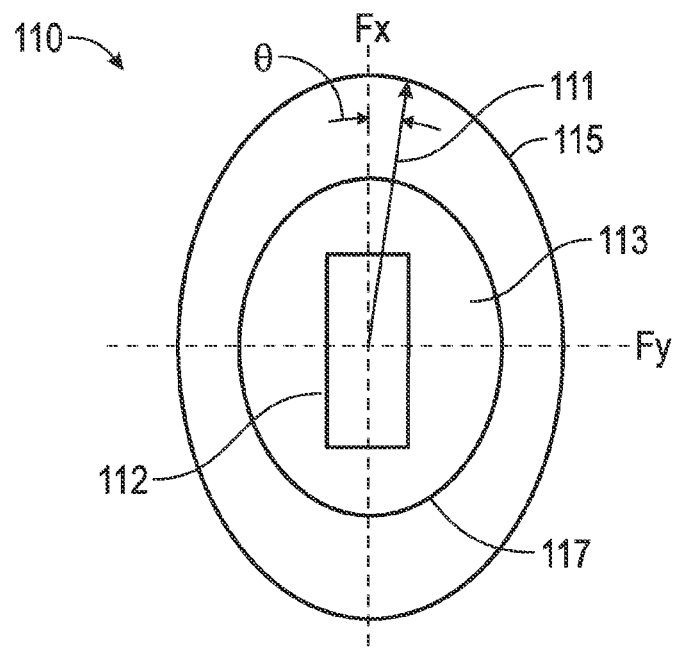
FIG. 2 is an explanatory diagram of a friction ellipse.

FIG. 2 is a simplified diagram of a friction circle or a friction ellipse 110 that exists for a theoretical vehicle tire 112. A friction ellipse is a useful way to think about the dynamic interaction between a vehicle's tire 112 and a road surface 113. FIG. 2 presents the tire 112 from above, such that the road surface 113 lies in the X-Y plane. The vehicle (See FIG. 5) that the tire is attached to is moving in the positive X direction. The friction ellipse 110 is mathematically defined as:

$$\left(\frac{Fx}{Fxmax}\right)^2 + \left(\frac{Fy}{Fymax}\right)^2 = 1, \quad \text{(equation 1)}$$

where $F_x$ is the force of the tire in the x direction $F_{xmax}$ is the maximum force that is able to be applied in the x direction, $F_y$ is the force of the tire in the y direction, and $F_{ymax}$ is the maximum force that is able to be applied in the y direction.

Similarly, by factoring out the mass of the vehicle, the friction ellipse 110 may also be mathematically defined in terms of acceleration as:

$$\left(\frac{Ax}{Amax}\right)^2 + \left(\frac{Ay}{Amax}\right)^2 = 1 \qquad \text{(equation 2)}$$

The size of the ellipse 115 (i.e., the maximum force the tire can generate before overcoming the frictional force of the road surface) is determined by the coefficient of friction of the road surface, which for a given vehicle mass is influenced by several factors including the condition of the tire, temperature, amount of precipitation on the road, and the geometry (size) of the tire. For explanatory purposes, friction ellipse 115 is also referred to herein as a "high coefficient" friction ellipse.

A tire 112 can generate horizontal force where the tire meets the road surface by the mechanism of slip 111. In this example that point would be the origin of abscissa ($F_x$) and the ordinate ($F_y$). The slip 111 in the example is in the X-Y plane and perpendicular to the rolling plane of the tire. In FIG. 2 the vehicle would be turning to the right. Thus, the plane of rotation of the tire 112 is at an angle to the instantaneous direction that the vehicle is traveling, which is in the X direction. That angle θ is the slip angle.

The limitation of the slip 111 is the friction ellipse 115 based on equation 1. The tire 112 is generating a component of force ($F_x$) in the forward and aft direction and generating a component of lateral force ($F_y$) which, when transferred to a vehicle's chassis via a suspension system in combination with similar forces of the other three tires, will cause the vehicle to turn.

Every tire/road surface has its own coefficient of friction. There is a coefficient of static friction and a coefficient of kinetic friction. Static friction is friction between two or more solid objects that are not moving relative to each other. For example, static friction can prevent an object from sliding down a sloped surface. The static coefficient of friction is also what enables the tire to roll down a road without sliding. The coefficient of static friction, typically denoted as $\mu_s$, is usually higher than the coefficient of kinetic friction. There is no mathematical relationship between static and kinetic friction. However the kinetic coefficient of friction is typically 25-40% less than the static coefficient of friction for most surface interfaces.

The static friction force must be overcome by an applied force before an object can slide across the surface. The maximum possible friction force between two surfaces before sliding ($F_{max}$ or $A_{max}$) begins is the product of the coefficient of static friction $\mu_s$ and the normal force exerted by the tire 112 ($F_n$) relative to the road surface 113.

$$F_{max} = \mu_s F_n \qquad \text{(equation 3)}.$$

When there is no sliding occurring, the friction force can have any value from zero up to $F_{max}$. Any force smaller than $F_{max}$ attempting to slide one surface over the other is opposed by a frictional force $F_f$ of equal magnitude and opposite direction. Any force larger than $F_{max}$ overcomes the force of static friction and causes sliding to occur. The instant sliding occurs, static friction is no longer applicable. The friction between the two surfaces is then called kinetic friction, which is typically 25-40% lower than static friction.

An example of static friction is the force that prevents a car wheel from slipping as it rolls on the ground. Even though the wheel is in motion, the patch of the tire in contact with the ground is stationary relative to the ground, so it is static rather than kinetic friction.

Kinetic (or dynamic) friction occurs when two objects are moving relative to each other and rub together (like a sled on the ground). The coefficient of kinetic friction is typically denoted as $\mu_k$, and is usually less than the coefficient of static friction for the same materials. The force of kinetic friction is given by:

$$F_{max} = \mu_k F_n \qquad \text{(equation 4)}.$$

Kinetic friction is now understood, in many cases, to be primarily caused by chemical bonding between the surfaces, rather than interlocking asperities; however, in many other cases roughness effects are dominant, for example in rubber to road friction.

Referring back to FIG. 2, the friction ellipse 115 is called the high friction ellipse because it involves a surface with a relatively high coefficient of static friction. Should the coefficient of friction of the road surface change due to a different surface being encountered (e.g., ice instead of pavement), or because the static coefficient of friction has been overcome and a lower kinetic coefficient of friction is now dominant, the friction ellipse will necessarily reduce to the low coefficient of friction ellipse 117 for purposes of braking and steering. This new ellipse may be thought of as a low friction ellipse.

Figures 3, 4:
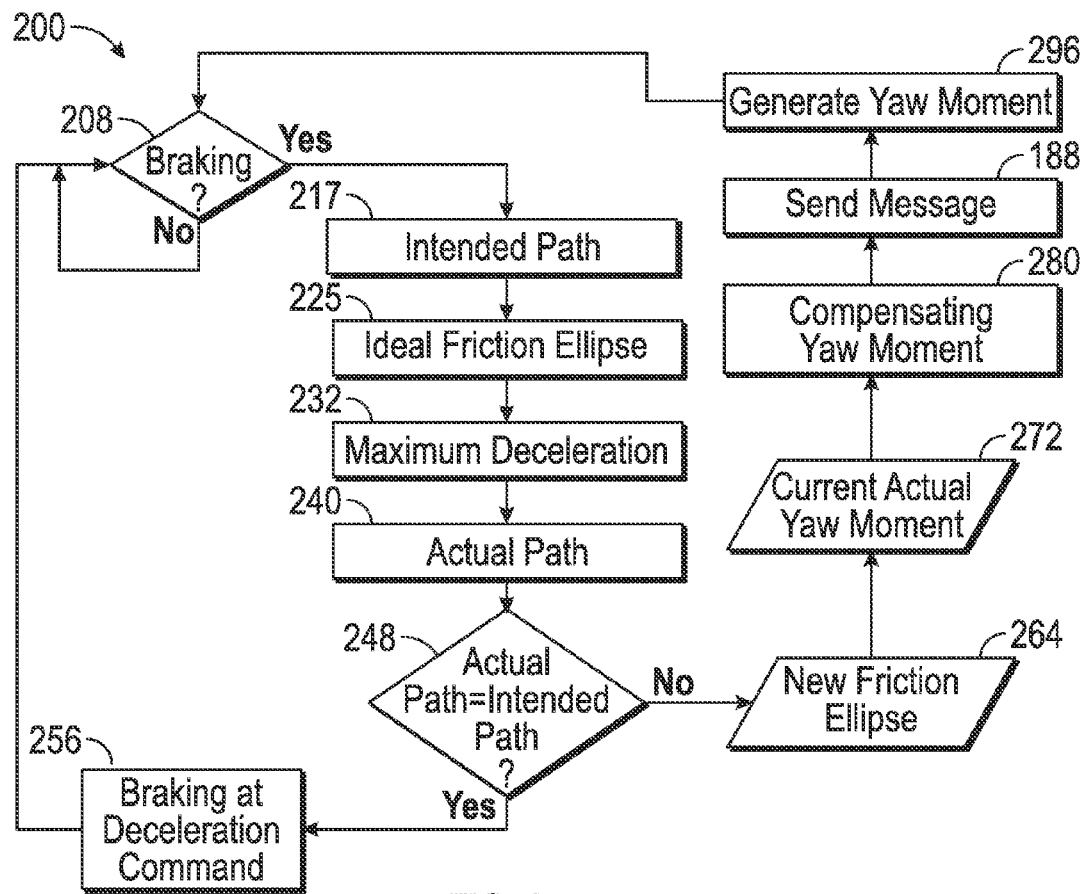
FIG. 3 is a logic flow diagram of an exemplary method for anticipatory travel path control.
FIG. 4 is a data table providing data illustrating the operation of the exemplary method of FIG. 3.

FIG. 3 is a logical flow chart of an exemplary method 200 to maintain a vehicle on a defined path during autonomous braking. The method is a set of logic steps executed by a computing device such as an electronic control module (ECM), processor, or controller 210. As a general point, nothing in the following methodology overrides a driver's ultimate control of the vehicle.

The method 200 begins at decision point 208 where the computing device checks for an indication that the brake has been applied or that an autonomous braking system 26 has been initiated. The autonomous braking may manifest itself as a semi-autonomous driver assisted braking or a truly autonomous application of the brakes. Systems that may use either autonomous or semi-autonomous braking include cruise control systems, collision avoidance systems and intended path systems (e.g., driverless vehicles).

When autonomous braking is detected an intended vehicle path is determined at process 217. An "intended vehicle path" as used herein means a path that is 1) suitable for vehicular traffic for the type of vehicle doing the autonomous braking and 2) is most likely the immediate direction intended to be steered by the driver. Such a determination may be made by one or a combination of inputs that are currently known in the art or that may be devised in the future and will not be discussed herein further in the interest of clarity and brevity. Such inputs my include, but are not limited to a planned map route (GPS), the steering angle of either the tires 112 or the angular displacement of steering wheel 23 itself, and a photo/video analysis of road markings.

At process 225, an ideal friction ellipse is calculated assuming the surface is a high-coefficient surface based on customary driving surfaces. In equivalent alternative embodiments, the coefficient of friction may be mathematically determined from acceleration measurements. Because the design lateral acceleration and longitudinal capabilities of the vehicle are known, this is used to compute the high-coefficient friction ellipse.

At process 232, the maximum deceleration ($Ax_{max}$) is determined based on the current or high friction ellipse calculated in process 225 above.

At process 240, the vehicle's actual path is determined. Such a determination may be made by one or a combination of inputs that are currently known in the art or that may be devised in the future. Such inputs may include, but are not limited to a dead reckoning system, an inertial guidance system and a GPS system. The determination is made based on any method known in the art or that may be devised in the future. Exemplary on-limiting examples of inputs used for such determination include the instantaneous deviation from a mapped route or a difference in the steering angle of the wheels relative to the known direction of the actual path being traveled. Systems that produce such inputs are well known in the art and will not be discussed further herein in the interest of clarity and brevity.

At decision point 248, a comparison is made to determine if the actual vehicle path is on and within the intended vehicle path. In some exemplary embodiments the measuring rate is 25 times per second or more. However, the measuring rate may also be much lower as desired to accommodate particular hardware and software capabilities. Path comparison may be accomplished by a variety of methods, either individually or in combination. Some exemplary, non-limiting methods include a comparison between actual and expected Global Positioning System (GPS) coordinates, a comparison of a direction of travel of the center of gravity of the vehicle to an angular displacement of a steering wheel and an analysis of photographic/video input of road lines and markings.

For example, when a road mapping system (e.g., GPS) indicates the road to be traveled is a two lane road and after an assisted braking signal is generated, if the actual path (i.e., at least two geographical fixes) indicates that the vehicle is still travelling parallel to the road lanes and traveling in the intended direction, then the actual vehicle path is on and within the intended vehicle path. In this case the method proceeds to process 256 where braking continues at the deceleration commanded in process 232.

When the actual path of the vehicle is heading towards a different lane or off the road, then the vehicle is not on the intended path, in which case the method proceeds to process 264. Therefore, as long as the actual vehicle path is within or on the intended vehicle path, method 200 loops back to decision point 208 via process 256.

At process 264, a new friction ellipse is calculated by the CPS adjustment controller 224 based on an apparent new coefficient of friction. The static coefficient of friction $\mu_s$ may have changed because the surface 113 of the roadway being traveled by the vehicle 50 changes, such as in the case of encountering black ice. The new friction ellipse may be anticipatory.

To establish this new friction ellipse, equation 2 is used to calculate the new maximum acceleration components $(A_{xmax}, A_{ymax})$ in real time. To do this, the acceleration components of the wheel in the X and Y direction $(A_x, A_y)$ are taken from a measured data set taken before the vehicle has left the intended path (See, e.g., FIG. 4). The data set chosen is one that most likely captures the immediate time period before which the vehicle has entered the condition. However, a time period just before the departure or one of the two that is chosen after a comparison between the two may be used if necessary. The X and Y acceleration components $(A_x, A_y)$ are applied to equation 2 using the same vehicle specific maximum accelerations $(A_{xmax}, A_{ymax})$, which are only assumed in this exemplary embodiment to be constants for the sake of simplicity.

For example, if $A_{xmax}$ and $A_{ymax}$ are 10 m/s² and 8 m/s², respectively, and sensed $A_x$ and $A_y$ are 7 m/s² and 4 m/s², respectively, the size of the friction ellipse is now 74% of the original high-coefficient friction ellipse. Thus, the new max deceleration is 74% of the initial maximum deceleration, or 7.4 m/s².

In alternative embodiments, the reduction in the friction ellipse may be anticipatory in that braking and/or steering commands may be calculated in advance to further mitigate a path deviation. For example, when a path deviation is detected, the method may branch to read pre-stored max acceleration levels (i.e., 74%). The pre-stored levels may be fixed numbers or may be dependent on vehicle speed. The new friction ellipse may then be periodically and iteratively calculated based on actual acceleration measurements of the new road surface, or by some pre-determined mathematical formula or look up table.

Based on the pre-stored or measured accelerations, a new maximum acceleration cap may be determined by applying the following elliptical relationships:

$$\left(\frac{Ax}{AxmaxNew}\right)^2 + \left(\frac{Ay}{AymaxNew}\right)^2 <= 1 \quad \text{(equation 5)}$$

where $A_{xmaxNew}$ and $A_{ymaxNew}$ are the new acceleration components in the X and Y directions, respectively.

At process 272, a current actual yaw moment of the vehicle is calculated in real time. The calculation and/or measurement of vehicle yaw is well known in the art and will not be discussed further herein in the interest of clarity and brevity. Yaw is given by the equation:

$$Yaw = V/2 * \pi * R \quad \text{(equation 6)}$$

Where, V is the vehicle velocity and R is the radius of curvature (either actual and/or needed as the need may be). The path error is then the difference between the yaw of the intended path and the actual yaw.

$$\text{Path Error} = Yaw_{Desired} - Yaw_{actual} = V/2*pi*R_{Desired} - V/2*pi*R_{actual} \quad \text{(equation 7)}.$$

Figure 6:
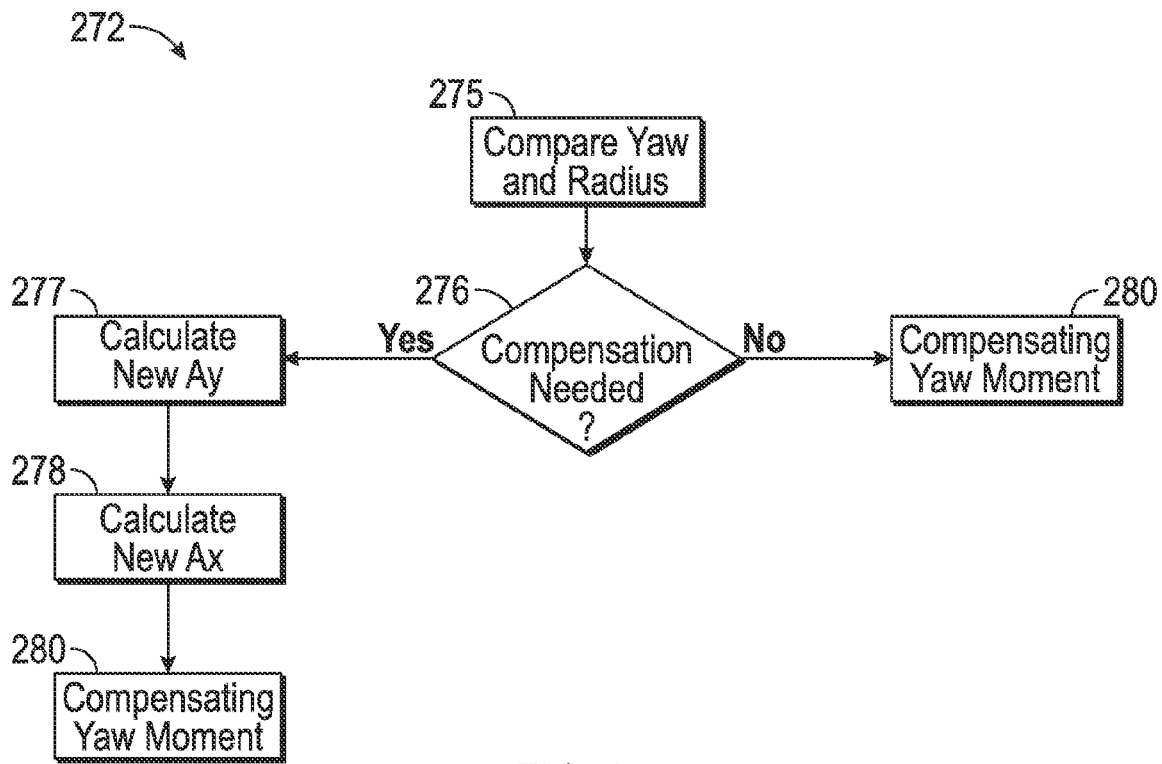
FIG. 6 is a subsystem logic flow diagram of process block 272 of FIG. 3.

FIG. 6 is a logic flow diagram illustrating the sub-method of process 272 for determining whether or not there is enough accumulated path error to generate commands to the steering and braking systems. At process 275, the desired yaw ($Yaw_{Desired}$) is compared to the actual yaw ($Yaw_{actual}$) and the desired radius of curvature ($R_{des}$) is compared to the actual traveled radius of curvature ($R_{act}$). Path compensation is needed (i.e., it is true) when the difference in the radius of curvatures as a fraction of the desired radius of curvature is greater than or equal to a second predetermined value (Q) or when the Path compensation was true in the previous measurement cycle and the absolute value of the current accumulated path error is greater than a predefined threshold (P).

$$|R_{act} - R_{des}|/R_{des} \quad \text{(equation 8)}$$

Otherwise, path compensation is not needed (i.e., it is false).

When path compensation is not needed, method 200 proceeds back to decision point 208 and $A_y$ is $V^2/R_{des}$. When path compensation is needed, a new $A_y$ and $A_x$ is calculated at processes 277 and 278 using the following equations:

$$A_X = A_{Xmax}(1-(A_y/A_{ymax})^2)^{0.5} \quad \text{(equation 9)}$$

$$A_y = V^2/R_{act} + \alpha t V K \quad \text{(equation 10)}$$

where, K is a scalable factor, α is the angular acceleration needed to correct the path error and t compensating yaw moment given by the equation:

$$T = I\alpha, \quad \text{(equation 11)},$$

where, I is the moment of inertia of the vehicle and the angular acceleration α is given by $$\alpha = Z * \text{path error/cycle time} \quad \text{(equation 12)},$$

where, Z is a calibration ratio.

When path error is false (i.e., 0), the cycle time is the cycle time the method 200 is running on. In this regard, those of ordinary skill in the art will recognize that calculation and sensor latencies may require the equations 1-13 to be modified to account. It takes a finite time to determine lateral acceleration based on compensating yaw moment, for example. Latencies may simply be modeled as straight line time delays, but other modifications well known in the art may be used by skilled artisans based on the processors, sensors and other physical hardware chosen to implement the subject matter disclosed herein.

Referring back to FIG. 3, at process 280 if the yaw moment calculated at process 272 is determined to be non-zero and/or outside a predetermine tolerance, a compensating yaw moment is determined and commands to the steering system 24 and/or autonomous braking system 26 to counteract the actual yaw are created. Steering systems, differential braking systems and the commands to control each are well known in the art. Thus, in the interest of clarity and brevity these systems will not be described further. The compensating yaw moment is defined as:

$$A_{yaddtnl} = wV \qquad \text{(equation 13)},$$

where w is the yaw rate in degrees/second and V is the vehicle velocity, such that the sum of $A_y$ and $A_{yaddtnl}$ will not exceed the maximum acceleration limits of the new friction ellipse determined above. The compensating yaw moment is then the amount of yaw needed to eventually minimize the path error between the actual and driver intended paths. The accumulated path error is the summation or integration of the path error over time Once the compensating yaw moment is determined, messages using well known methods of inter-vehicle digital communications are sent (step 188) to steering system 24 and/or autonomous braking systems 26 to generate the compensating yaw moment (step 296) to bring the vehicle back to its intended path.

FIG. 4 is a data table 300 providing data illustrating the operation of the exemplary method 200 of FIG. 3. The columns 301-310 contain the following information:

| Col. | Data |
|---|---|
| 301 | Longitudinal Acceleration (Ax) (m/sec)$^2$ |
| 302 | Lateral Acceleration (Ay) (m/sec)$^2$ |
| 303 | Velocity (m/sec) |
| 304 | Desired Radius of Curvature (m) |
| 305 | Observed Radius of Curvature (m) |
| 306 | Path Error Algorithm Active (1 or 0) |
| 307 | Compensating Yaw Moment (degrees/sec) |
| 308 | Needed Yaw (degrees/sec) |
| 309 | Actual Yaw (degrees/sec) |
| 310 | Accumulated Yaw Error (degrees) |

As may be seen from the first two rows of FIG. 4 representing two initial time periods, a vehicle is traveling at about 30 m/sec on a turn with a radius of curvature of 200 meters. At time period 3, a path error is indicated at column 306, such that the curvature of the path actually being followed by the vehicle is one that has a radius of 230 m instead of the expected 200. In column 310 an accumulated yaw error is displayed, which is the accumulated difference between the needed yaw and the actual yaw in columns 308 and 309, respectively. An amount of compensating yaw to be provided by the CPS adjustment controller 224 is displayed in column 307.

It should be noted the in time period 3 when a path error is 306 first detected, the friction ellipse is reduced reflecting a lower coefficient of static friction being encountered. The reduced friction ellipse defines a new, lower maximum longitudinal and lateral acceleration ($A_{xmaxNew}$, $A_{ymaxNew}$). The compensating yaw is iteratively calculated and applied until the path error is eliminated.

Figure 5:
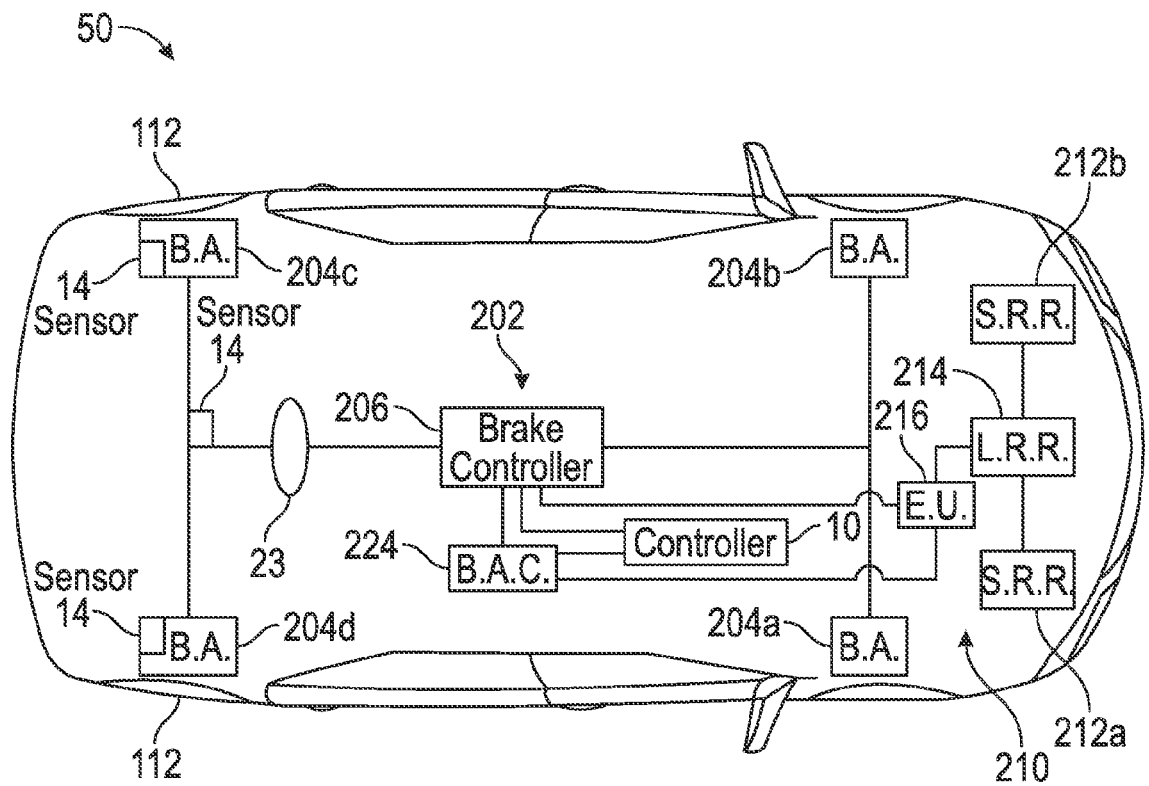
FIG. 5 is a depiction of a vehicle configured according to embodiments herein.

FIG. 5 is a depiction of a vehicle 50 configured according to embodiments herein. Vehicle 50 has a braking system 202 including brake actuators 204a, 204b, 204c, 204d and a brake controller 206. A collision preparation system (CPS) 210 is interfaced with the braking system 202. The CPS 210 may be, for example, implemented by the disclosure of U.S. Pat. No. 6,084,508, and may include, for example, short range radar 212a, 212b, long range radar 214 and an evaluating unit 216. A collision preparation system braking adjustment controller 224 is interfaced with the braking system 202 so as to adjust the braking in accordance with the present invention, and receives operational data to carry out its function, as for example from the CPS 210.

The vehicle 50 also comprises sensors 14 to determine steering angle, position of steering wheel 23, vehicle geographic position (e.g., GPS mapping systems), braking force, acceleration of the vehicle in at last two dimensions, acceleration of each tire 112, etc. as may be desirable or required to carry out the methods disclosed herein or as recited in the claim herein. The number, nature or operation of these myriad of sensors 14 and those not specifically mentioned herein are all notoriously well known in the art and will not be described further herein in the interest of clarity and brevity.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

The invention claimed is:

1. A travel path control method for a vehicle, comprising steps of:
   detecting a braking of the vehicle by a computing device;
   calculating a prospective friction ellipse for the vehicle based on a current state of the vehicle;
   determining if there is a path error where an actual vehicle travel path is outside an intended vehicle travel path when the braking is detected;
   when the actual vehicle travel path is outside the intended vehicle travel path, calculating a new friction ellipse for the vehicle;
   determining a compensating yaw moment to correct the path error;
   determining a maximum acceleration based on the prospective friction ellipse; and
   transmitting a command to a controller based on the maximum acceleration and the compensating yaw moment.

2. The travel path control method of claim 1, wherein the braking is an initiation of a manual braking.

3. The travel path control method of claim 1, wherein the braking is an initiation of an autonomous braking.

4. The travel path control method of claim 1, wherein determining the maximum acceleration comprises determining a maximum longitudinal acceleration.

5. The travel path control method of claim 1, wherein determining the maximum acceleration comprises determining a maximum lateral acceleration.

6. The travel path control method of claim 1, wherein the intended travel path of the vehicle is a portion of a selected route executing a GPS system.

7. The travel path control method of claim 1, is determined by a steering angle of a steering wheel during the braking.

8. The travel path control method of claim 1, wherein the path error is determined by a comparison between the intended vehicle travel path and the actual vehicle travel path.

9. The travel path control method of claim 1, wherein the new friction ellipse is determined from sensor measurements.

10. The travel path control method of claim 1, wherein the new friction ellipse is determined from a predefined scaling factor in an iterative fashion.

11. The travel path control method of claim 1, wherein the controller is a steering controller.

12. The travel path control method of claim 1, wherein the controller is a braking system controller.

13. A travel path control system for a motor vehicle, comprising:
   a braking system;
   a collision preparation system interfaced with said braking system, wherein said collision preparation system selectively implements autonomous braking of the motor vehicle during activation thereof responsive to predetermined conditions of travel of the motor vehicle;
   a collision preparation system braking adjustment controller interfaced with said braking system;
   and at least one source of data available to said collision preparation system braking adjustment controller, said source of data comprising a vehicle acceleration, an actual vehicle travel path and a driver intended vehicle travel path;
   wherein, said collision preparation system braking adjustment controller compares the driver intended vehicle travel path to the actual vehicle travel path during the activation,
   when the actual vehicle travel path is outside desired travel path said collision preparation system is configured to:
   calculate a prospective friction ellipse of the vehicle;
   determine a compensating yaw moment to correct the actual vehicle travel path;
   determine a maximum acceleration based on the prospective friction ellipse; and
   transmit a braking command based on the maximum acceleration and the compensating yaw moment.

14. The travel path control system of claim 13, wherein the braking command is transmitted to the collision preparation system braking adjustment controller based on the maximum acceleration and the compensating yaw moment.

15. The travel path control system of claim 13, further comprising a steering controller.

16. The travel path control system of claim 15, wherein the braking command is transmitted to the steering controller based on the maximum acceleration and the compensating yaw moment.

17. A motor vehicle comprising;
   at least two wheels and a braking system engagable with the wheels;
   a collision preparation system interfaced with said braking system, wherein said collision preparation system selectively implements autonomous braking of the motor vehicle during activation thereof responsive to predetermined conditions of travel of the motor vehicle;
   a collision preparation system braking adjustment controller interfaced with said braking system;
   and at least one source of data available to said collision preparation system braking adjustment controller, said data comprising vehicle acceleration, actual vehicle travel path and driver intended vehicle travel path;
   wherein, said collision preparation system braking adjustment controller compares the desired travel path to the actual vehicle travel path during the activation,
   when the actual vehicle travel path is outside desired travel path said collision preparation system is configured to:
   calculate a prospective new friction ellipse of the vehicle;
   determine a compensating yaw moment to correct the error in path;
   determine a maximum acceleration based on the prospective friction ellipse, and
   transmit an braking command to the braking system based on the maximum acceleration and the compensating yaw moment.

18. The travel path control system of claim 17, wherein the braking command is transmitted to the collision preparation system braking adjustment controller based on the maximum acceleration and the compensating yaw moment.

19. The vehicle of claim 17, further comprising a steering controller.

20. The vehicle of claim 19, wherein the braking command is transmitted to the steering controller based on the maximum acceleration and the compensating yaw moment.

* * * * *